M. B. GATHMAN.
CUTTER HEAD SPINDLE FOR PLANERS AND MOLDERS.
APPLICATION FILED AUG. 6, 1920.
1,406,843.
Patented Feb. 14, 1922.
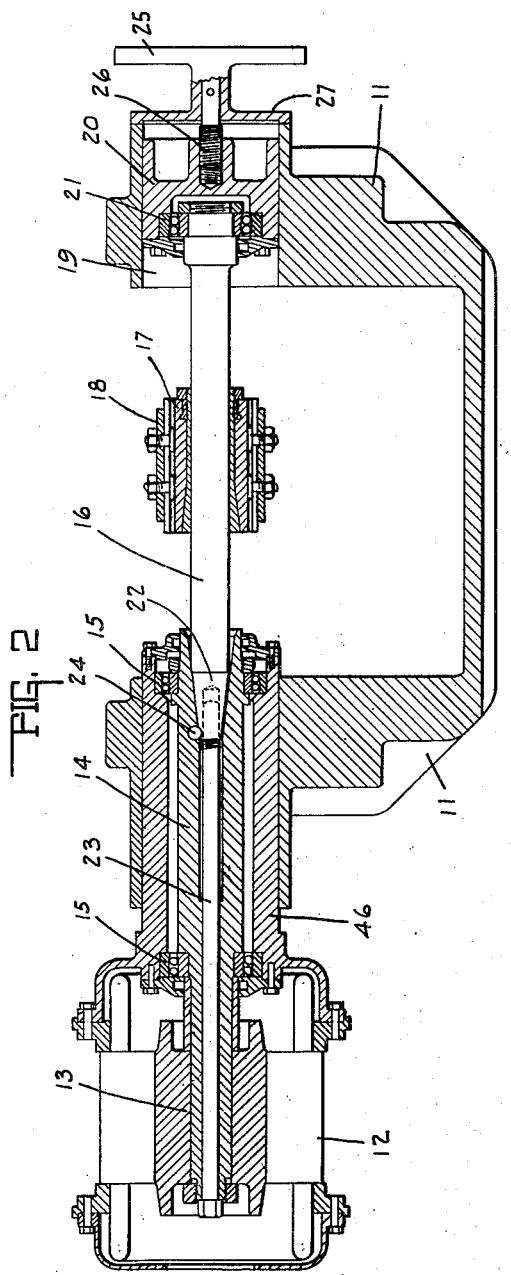
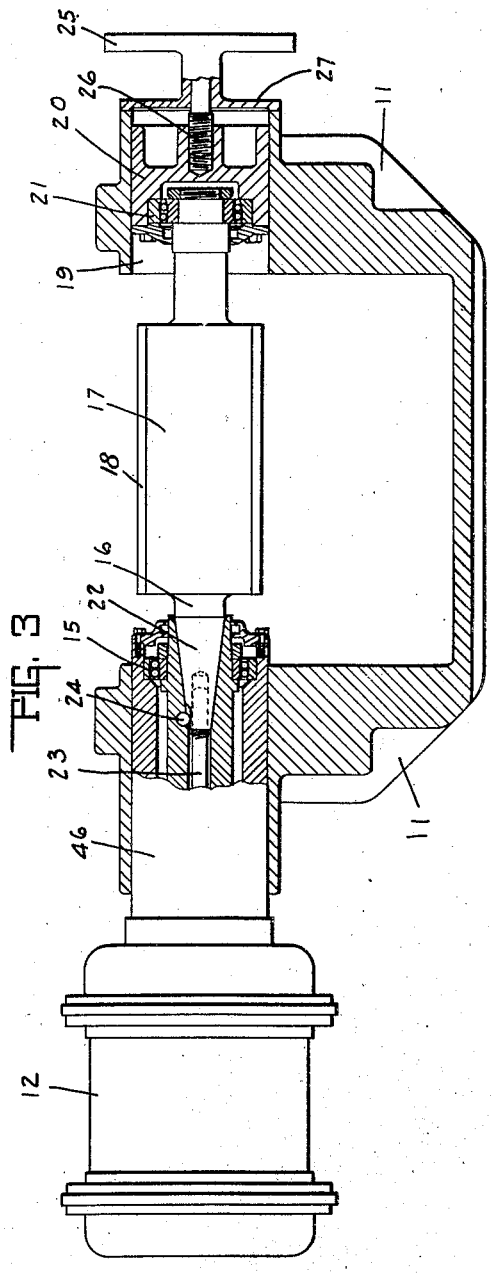
INVENTOR.
MONTE B. GATHMAN.
BY
ATTORNEYS.

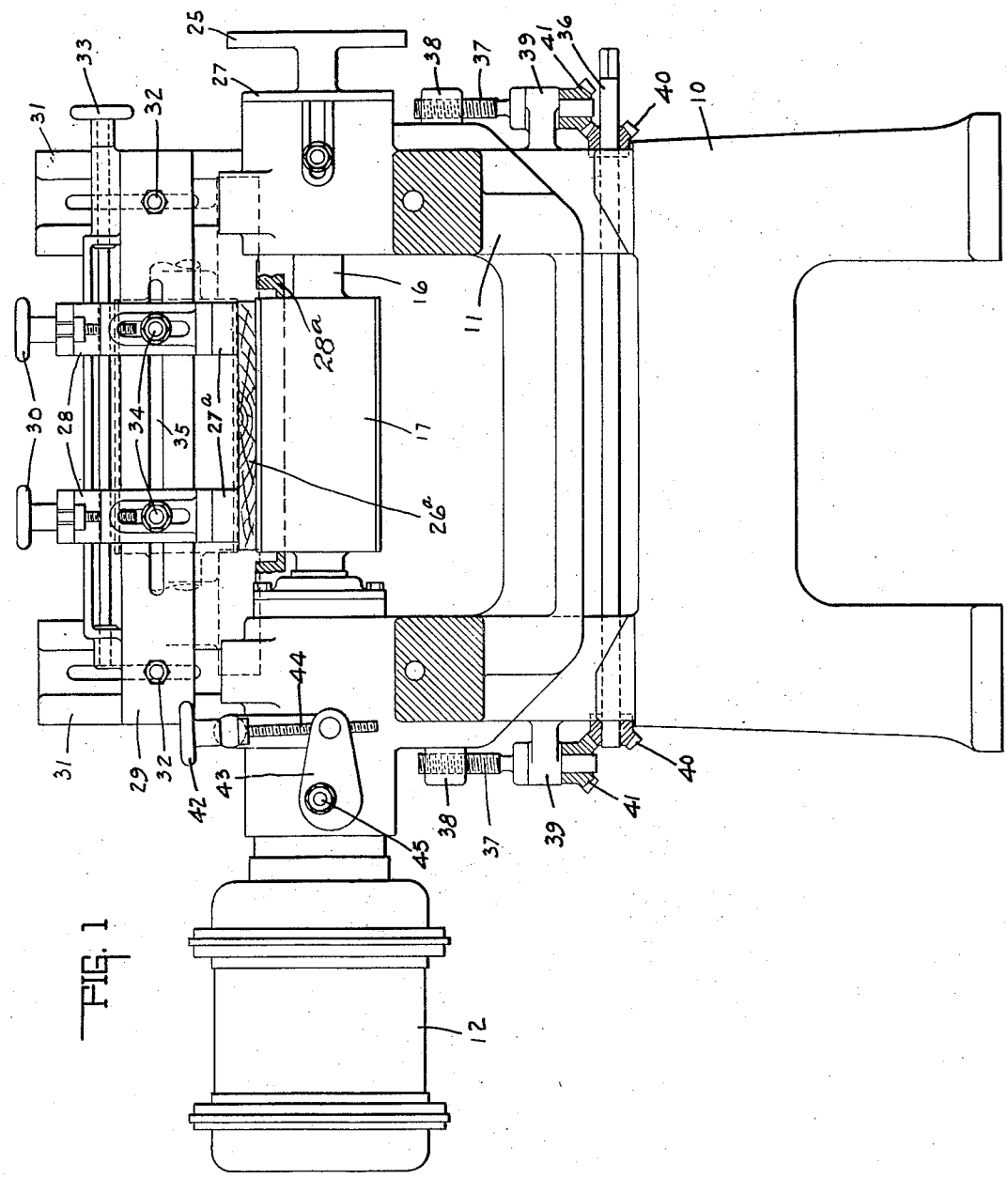

UNITED STATES PATENT OFFICE.

MONTE B. GATHMAN, OF SHELBYVILLE, INDIANA, ASSIGNOR TO ANTON VONNEGUT, OF INDIANAPOLIS, INDIANA.

CUTTER-HEAD SPINDLE FOR PLANERS AND MOLDERS.

1,406,843.  Specification of Letters Patent.  Patented Feb. 14, 1922.

Application filed August 6, 1920. Serial No. 401,621.

*To all whom it may concern:*

Be it known that I, MONTE B. GATHMAN, a citizen of the United States, and a resident of Shelbyville, county of Shelby, and State of Indiana, have invented a certain new and useful Cutter-Head Spindle for Planers and Molders; and I do hereby declare that the following is a full, clear, and exact description thereof, reference being had to the accompanying drawings, in which like numerals refer to like parts.

This invention relates to new and useful improvements in molding machines for wood working and the like, and particularly to the means for mounting the cutter head and shaft in the carriage of the machine whereby the entire cutter head and shaft may be readily set therein or removed without removing any of the parts thereof.

The particular feature of the invention consists in the construction of the shaft bearings and carriage of the machine whereby the entire shaft bearings and cutter head may be mounted and locked in operative position. Such a machine, in which the cutter head is either adjustably secured upon the shaft or rigidly integral therewith, may be mounted within the carriage instead of on the outside thereof and will readily permit of the removal thereof.

The full nature of this invention will be understood from the accompanying drawings and the following description and claims.

In the drawings Fig. 1 illustrates an end view of a molding machine with the cutter head mounted therein the supporting table being broken away. Fig. 2 is a central vertical section of the carriage, cutter head and motor taken through the center thereof, showing an adjustable cutter head, on the shaft. Fig. 3 is the same as Fig. 2 showing the motor and cutter head integral with the shaft in elevation.

In the drawings there is shown a molding machine having a base 10 upon which is supported a carriage 11, said carriage supporting a motor housing 12 in which there is a rotor 13 adapted to drive the spindle 14 which is integral therewith, said spindle being supported within the bearings 15 secured on one side of said carriage, for the purpose of electrically driving the cutter head shaft 16, cutter head 17 and cutter blades 18. The opposite side of the carriage 11 is provided with an opening 19 which carries a bearing support and closure, said opening being of larger diameter than the cutter head 17 and in which snugly fits a bearing housing 20 for enclosing and supporting the bearings 21 of the shaft 16. The end of the shaft 16 opposite to the bearings 21 is tapered as at 22 so as to fit into the flared opening of the spindle 14 and be drawn and wedged therein by the rod 23 which extends longitudinally of the spindle 14 and is provided with screw threads on its ends adapted to screw into the tapered end of the shaft 16. By this construction the rod 23 may be engaged through the end opening of the motor housing and turned so as to screw into the end of the shaft 16 and draw it securely into wedging position in the spindle 14. The shaft 16 is keyed to the spindle 14 by the engagement of a flattened surface on the tapered end by a pin 24 secured in the spindle.

From the foregoing description of the construction of the cutter head, shaft and carriage, it will be observed that the cutter head may be embraced between the two sides of the carriage and may be removed therefrom upon the shaft so that its adjustment upon the shaft need not be disarranged, or in case the cutter head is formed integral with the shaft it may be readily removed. The removal of the shaft is accomplished by means of the hand wheel 25 which has a threaded stud 26 adapted to screw in the outer end of the bearing housing 20 whereby by means of the pressure of plate 27 abutting against the carriage, the housing and shaft may be forcibly drawn from its wedged position with regard to the spindle 14 after the rod 23 is unscrewed. When the shaft is thus loosened it may be readily drawn from the carriage through the opening 19 with the cutting block secured upon it.

This arrangement permits of the cutter block being permanently secured to the shaft so that, after it is mounted thereon in adjusted position, the entire combination can be withdrawn from the machine and another cutter head and shaft placed in position for another adjustment of the blades. After that cutter has been used it can again be withdrawn and the first one mounted back in place, the adjustment being the same. This facilitates handling of the machines for different pieces of work.

The mounting of the machine and its adjustment to the work is shown in Fig. 1. There the work 26ᵃ is shown adjacent the upper portion of the cutter head held in place by the wooden presser blocks 27ᵃ adjustably secured on the brackets 28 which are adjusted to the presser block beam 29 by the adjusting hand wheels 30. The beam 29 may be raised or lowered on the standards 31 and secured in proper position by the bolts 32, whereas the brackets 28 may be adjusted longitudinally of the beam by means of the hand wheel 33, causing the guide bolts 34 to slide longitudinally of the guide slots 35 extending longitudinally of said beam. The work is supported on the usual work supporting table 28ᴬ, the end thereof being omitted for clearness of illustration.

The carriage, motor and cutter head may be adjusted with relation to the base of the machine, or the work and its support, by means of the shaft 36 which may be turned by means of the crank for turning the screws 37 which screw into the brackets 38 secured to the sides of the carriage, said screws being supported in the bearings 39 secured on the side of the base. The screws 37 are turned by means of the shaft 36 through the bevel gears 40 and 41 respectively.

A fine adjustment of the motor housing 12 and the parts secured thereto, including the shaft 14 and the cutter head, may be had longitudinally of the carriage by means of sliding the housing of the shaft 14 longitudinally of the bearing portion of said carriage by the hand wheel 42 which operates an arm 43 through the threaded shaft 44 which turns an eccentric pivoted to the carriage at 45 and engaging the spindle housing 46, thereby sliding it longitudinally of said carriage and enabling the cutter head to be finely adjusted.

The invention claimed is:

1. A carriage for motor driven molders having bearing openings on each side thereof and a central spaced portion in which the cutter head is adapted to revolve, a driving motor adjustably supported on one side of said carriage, a shaft removably connected to said motor on which said cutter head is rigidly secured, and a bearing member secured to the end of said shaft opposite the motor and adapted to fit within the bearing opening of said carriage, said opening being large enough to permit the longitudinal removal of said bearing member shaft and cutter head therethrough as a unit.

2. A carriage for motor driven molders having bearing openings on each side thereof, and a central spaced portion in which the cutter head is adapted to revolve, a driving motor adjustably supported on the side of said carriage, a shaft removably connected to said motor on which said cutter head is rigidly secured, a bearing member secured to the end of said shaft opposite the motor and adapted to fit within the bearing opening of said carriage, said opening being large enough to permit the longitudinal removal of said bearing member, shaft and cutter block therethrough as a unit, and means engaging said bearing member and carriage for forcibly withdrawing said unit therefrom.

3. A carriage for motor driven molders having a bearing support thereon and a central spaced portion in which the cutter head is adapted to revolve, a driving motor supported on one side of said carriage, a cutter head shaft removably connected to said motor, a bearing member secured to the end of said shaft opposite the motor adapted to be supported on said carriage, said carriage being so arranged as to permit the removal of said bearing member, shaft and cutter head therefrom as a unit.

4. A molding machine having a shaft removably mounted thereon, a cutter head mounted on said shaft, a motor, a spindle driven by said motor, means for removably connecting said shaft with said spindle so as to be driven thereby, a bearing for supporting the opposite end of said shaft from said spindle, a bearing support on said machine for removably securing said bearing whereby said bearing shaft and cutter head may be removed from said support, and means mounted adjacent said support for drawing said shaft out of wedging engagement with said spindle whereby said shaft, cutter head and bearing may be removed as a unit therefrom.

In witness whereof, I have hereunto affixed my signature.

MONTE B. GATHMAN.